(12) United States Patent
Burmester

(10) Patent No.: US 11,662,773 B2
(45) Date of Patent: May 30, 2023

(54) MOBILE ELECTRONIC DEVICE ENCLOSURE SYSTEMS FOR DOCKING AND CHARGING OPERATIONS

(71) Applicant: Ergonomics Solutions International Limited, Epsom (GB)

(72) Inventor: Benny Burmester, Nørresundby (DK)

(73) Assignee: ERGONOMIC SOLUTIONS INTERNATIONAL LIMITED, Epsom (GB)

(*) Notice: Subject to any disclaimer, the term of this patent is extended or adjusted under 35 U.S.C. 154(b) by 280 days.

(21) Appl. No.: 16/063,351

(22) PCT Filed: Dec. 14, 2016

(86) PCT No.: PCT/EP2016/080874
§ 371 (c)(1),
(2) Date: Jun. 18, 2018

(87) PCT Pub. No.: WO2017/102775
PCT Pub. Date: Jun. 22, 2017

(65) Prior Publication Data
US 2018/0364757 A1 Dec. 20, 2018

Related U.S. Application Data

(63) Continuation-in-part of application No. PCT/EP2016/080874, filed on Dec. 14, 2016.

(30) Foreign Application Priority Data

Dec. 17, 2015 (DK) .......................... PA 2015 00817

(51) Int. Cl.
*G06F 1/16* (2006.01)
*H02J 7/00* (2006.01)

(52) U.S. Cl.
CPC .............. *G06F 1/1632* (2013.01); *H02J 7/00* (2013.01); *H02J 7/0045* (2013.01);
(Continued)

(58) Field of Classification Search
CPC ................ G06F 1/1632; G06F 1/1626; G06F 2200/1633; G06F 1/16; H02J 7/0052;
(Continued)

(56) References Cited

U.S. PATENT DOCUMENTS 5,371,455 A * 12/1994 Chen .................... H02J 7/0029
320/165
6,375,344 B1 4/2002 Hanson
(Continued)

*Primary Examiner* — Edward Tso
*Assistant Examiner* — Aaron Piggush
(74) *Attorney, Agent, or Firm* — Cermak Nakajima & McGowan LLP; James Creighton Wray

(57) ABSTRACT

The present invention relates to mobile electronic device enclosures, and in particular to enclosure systems for docking and charging operations. The system comprises a mounting head, and a back housing of a mobile electronic device enclosure. The back housing of a mobile electronic device enclosure is removably attachable to the mounting head. The back housing comprises a charger control unit comprising a first power connection port, and a second two-way power connection port.

20 Claims, 8 Drawing Sheets

(52) U.S. Cl.
CPC .... *G06F 1/1626* (2013.01); *G06F 2200/1633* (2013.01); *H02J 2207/20* (2020.01)

(58) Field of Classification Search
CPC .... H02J 7/0045; H02J 2007/0059; H02J 7/00; H02J 2207/20
USPC .......................................... 320/115, 107, 114
See application file for complete search history.

(56) References Cited

U.S. PATENT DOCUMENTS

| | | | | |
|---|---|---|---|---|
| 9,103,150 B1* | 8/2015 | Wong | ................ | F16M 11/2064 |
| 2002/0178571 A1* | 12/2002 | Slezak | ............... | G11B 5/59627 |
| | | | | 29/603.03 |
| 2006/0035527 A1* | 2/2006 | Numano | ................ | G06F 1/266 |
| | | | | 439/668 |
| 2007/0067659 A1* | 3/2007 | Tevanian | ................ | G06F 1/266 |
| | | | | 713/324 |
| 2009/0284222 A1* | 11/2009 | Tamura | ................ | G06F 1/1632 |
| | | | | 320/112 |
| 2014/0052884 A1* | 2/2014 | Rogers | ................ | G06F 1/1632 |
| | | | | 710/303 |
| 2014/0191033 A1* | 7/2014 | Wojcik | ................ | G06F 1/263 |
| | | | | 235/449 |
| 2014/0191096 A1 | 7/2014 | Wiercinski | | |
| 2014/0247545 A1 | 9/2014 | Richardson | | |
| 2014/0355200 A1* | 12/2014 | Thiers | ................ | H04M 1/04 |
| | | | | 361/679.41 |
| 2015/0015180 A1* | 1/2015 | Miller | ................ | H02J 50/40 |
| | | | | 320/103 |
| 2015/0235532 A1* | 8/2015 | Marszalek | ............ | G06F 1/1613 |
| | | | | 340/568.3 |
| 2018/0307275 A1* | 10/2018 | Peil | ................ | H02J 50/80 |

\* cited by examiner

100

MOBILE ELECTRONIC DEVICE ENCLOSURE SYSTEMS FOR DOCKING AND CHARGING OPERATIONS

This application claims the benefit of Danish Application No. PA 2015 00817 filed Dec. 17, 2015 and PCT/DK2016/080874 filed Dec. 14, 2016, International Publication No. WO 2017 102775, which are hereby incorporated by reference in their entirety as if fully set forth herein.

TECHNICAL FIELD OF THE INVENTION

The present invention relates to mobile electronic device enclosures and in particular to enclosure systems for docking and charging operations.

BACKGROUND OF THE INVENTION

Many types of conventional mobile electronic device enclosures exist. However, only a few solutions are focused on mounted applications for retail and hospitality environments, which are suitable for mobile use in combination with an auxiliary mobile electronic device attached thereto, such as a card reader.

SUMMARY OF THE INVENTION

A first aspect relates to a docking system for a mobile electronic device, comprising:
 a mounting head, and
 a back housing and a front housing of a mobile electronic device enclosure;
 wherein the back housing of a mobile electronic device enclosure is removably attachable to the mounting head;
 wherein the mounting head comprises:
 a) a part of a coupling mechanism configured to removably couple the back housing of a mobile electronic device enclosure to the mounting head;
 b) at least one electrical contact point configured to be in electrical communication with a power source;
 wherein the back housing comprises:
 a) a part of a coupling mechanism configured to removably couple the back housing of a mobile electronic device enclosure to the mounting head;
 b) at least one electrical contact point configured to be in electrical communication with one or more electrical contact points on the mounting head when the back housing is engaged with the mounting head through the coupling mechanism;
 c) a charger control unit comprising:
 a first power connection port; and
 a second two-way power connection port;
 wherein the electrical communication allow a charging current to be transferred from an electrical contact point on the mounting head to the electrical contact point on the back housing;
 wherein the first power connection port is configured for electrical communication with a mobile electronic device positioned in the back housing, and operatively connected to a) the electrical contact point of the back housing, and b) to the second two-way power connection port;
 wherein the second two-way power connection port is configured for electrical communication with a) an auxiliary mobile electronic device, and
 b) an external power source, and operatively connected to the electrical contact point of the back housing.

Disclosed herein is a docking system for a mobile electronic device. The system comprises a mounting head, a back housing, and a front housing of a mobile electronic device enclosure. The back housing of a mobile electronic device enclosure is removably attachable to the mounting head.

The mounting head comprises a part of a coupling mechanism configured to removably couple the back housing of a mobile electronic device enclosure to the mounting head.

In one or more embodiments, the coupling mechanism is a magnetic coupling mechanism.

In one or more embodiments, the mounting head comprises a first female/male component, the first female component configured to removably receive a first male component of the back housing of a mobile electronic device enclosure to couple the mounting head to the back housing of a mobile electronic device enclosure.

In one or more embodiments, the mounting head may have both male and female components. The male components may be circular, or other shapes may be used.

In one or more embodiments, the mounting head further comprises a lock configured as a second male component.

The mounting head also comprises at least one electrical contact point configured to be in electrical communication with a power source.

The back housing comprises a part of a coupling mechanism configured to removably couple the back housing of a mobile electronic device enclosure to the mounting head.

Hence, the back housing is supported on the mounting head using mechanical design features and/or magnetic force.

In one or more embodiments, the back housing of a mobile electronic device enclosure comprises a part of a magnetic coupling mechanism configured to removably couple the back housing of a mobile electronic device enclosure to the mounting head.

In one or more embodiments, the back housing of a mobile electronic device enclosure also comprises a first male/female component, the first female component configured to removably receive a first male component of the mounting head to couple the mounting head to the back housing of a mobile electronic device enclosure.

In one or more embodiments, the back housing may have both male and female components. The male components may be circular, or other shapes may be used.

In one or more embodiments, the back housing of a mobile electronic device enclosure further comprises a lock anchor configured to engage with the lock of the mounting head; and positioned within a first indentation sized to engage the second male component of the mounting head.

In one or more embodiments, the back housing of a mobile electronic device enclosure further comprises a second or more indentations positioned, together with the first indentation, along at least a portion of a circumference, and sized to engage the second male component of the mounting head so as to align the back housing of a mobile electronic device enclosure with the mounting head in one or more discrete rotational orientations. Mobile electronic devices may have user displays that may be orientated in portrait or landscape positions. Mobile electronic devices may automatically change the orientation of the user screen based on how the mobile electronic device is being held. The indentations on the back housing, in combination with the second male component of the mounting head, may be used to easily locate typical operating positions of the mobile electronic device when docked.

The back housing comprises at least one electrical contact point configured to be in electrical communication with one or more electrical contact points on the mounting head when the back housing is engaged with the mounting head through the coupling mechanism. The electrical communication allow a charging current to be transferred from an electrical contact point on the mounting head to the electrical contact point on the back housing.

In one or more embodiments, the back housing of a mobile electronic device enclosure comprises at least one electrical contact point configured to be in electrical communication with at least one electrical contact point on the mounting head when an indentation of the back housing of a mobile electronic device enclosure is engaged with the second male component of the mounting head.

In one or more embodiments, the electrical communication (between the electrical contact points) allow a charging current to be transferred from the electrical contact point on the mounting head to the electrical contact point on the back housing of a mobile electronic device enclosure, and wherein the back housing of a mobile electronic device enclosure further comprises one or more cables in electrical communication with the electrical contact point on the back housing of a mobile electronic device enclosure, and wherein the cables are configured to pass the charging current to one or more mobile electronic devices removably coupled to the back housing of a mobile electronic device enclosure.

In one or more embodiments, the electrical communication (between the electrical contact points) allow a signal current to be transferred from the electrical contact point on the back housing of a mobile electronic device enclosure to the electrical contact point on the mounting head, wherein the signal current activates a coil in the mounting head configured to inductively communicate power from a power source included in the mounting head to one or more mobile electronic devices removably coupled to the back housing of a mobile electronic device enclosure.

The back housing comprises a charger control unit comprising a first power connection port and a second two-way power connection port.

The first power connection port is configured for electrical communication with a mobile electronic device positioned in the back housing, and operatively connected to a) the electrical contact point of the back housing, and b) to the second two-way power connection port. The second two-way power connection port is configured for electrical communication with a) an auxiliary mobile electronic device, and b) an external power source, and operatively connected to the electrical contact point of the back housing. Hence, the back housing, when docked, is configured to be used for charging an auxiliary mobile electronic device connected to the second two-way power connection port. Alternatively, an external power source may be connected to the second two-way power connection port, thereby allowing a mobile electronic device positioned in the back housing, and connected to the first power connection port, to be charged therefrom.

In one or more embodiments, the charger control unit further comprises a direct current polarity control circuit. This internal low-loss rectifier ensures that the polarity of the DC voltage is always correct when the back housing is mounted in either portrait or landscape position.

In one or more embodiments, the direct current polarity control circuit comprises one or more metal oxide semiconductor field effect transistors (MOSFETs). The MOSFET has very low on-resistance and thereby very low loss compared to a classical diode bridge solution.

In one or more embodiments, the charger control unit further comprises a power supply controller circuit. The voltage level in the mounting head is preferably selected to 12V DC. This reduces the current level and thereby the impact of wire length and gauge. Furthermore, the impact of dirt and dust on the contact points are reduced this way. In this situation, the power supply controller circuit is configured to convert the 12V DC input into 5.2V DC to be used for charging. In one or more embodiments, the power supply controller circuit is configured to raise the output voltage to compensate for voltage drop at high loads.

In one or more embodiments, the power supply controller circuit is configured for converting a voltage of 12V DC from the electrical contact point of the back housing into a voltage of 5.2V DC.

In one or more embodiments, the power supply controller circuit is a switch mode power-supply circuit.

In one or more embodiments, the power supply controller circuit is configured for initiating a thermal shut down operation if the temperature exceeds a preset threshold limit. In one or more embodiments, the power supply controller circuit is configured for auto reset after a thermal shut down operation, when the temperature has returned below a preset threshold limit.

In one or more embodiments, the charger control unit further comprises a charge monitoring circuit. Such circuit ensures that tablets are charged at maximum rate, without requiring any intervention from the user.

In one or more embodiments, the charge monitoring circuit is configured to monitor the load current of the mobile electronic device positioned in the back housing. In one or more embodiments, the charge monitoring circuit is configured to alter the power output from the power supply controller circuit when the load current of the mobile electronic device positioned in the back housing exceeds a preset threshold limit. This way, voltage drops are eliminated in the charge monitoring circuit itself, in the first power connection port, and in any internal cables between the first power connection port and the mobile electronic device positioned in the back housing.

A second aspect relates to a mobile electronic device enclosure comprising a back housing and a front housing, wherein the back housing comprises:
 a) a part of a coupling mechanism configured to removably couple the back housing of a mobile electronic device enclosure to a mounting head;
 b) at least one electrical contact point configured to be in electrical communication with one or more electrical contact points on the mounting head when the back housing is engaged with the mounting head through the coupling mechanism;
 c) a charger control unit comprising:
 a first power connection port; and
 a second two-way power connection port;
 wherein the electrical communication allow a charging current to be transferred from an electrical contact point on the mounting head to the electrical contact point on the back housing;
 wherein the first power connection port is configured for electrical communication with a mobile electronic device positioned in the back housing, and operatively connected to a) the electrical contact point of the back housing, and b) to the second two-way power connection port;

wherein the second two-way power connection port is configured for electrical communication with a) an auxiliary mobile electronic device, and b) an external power source, and operatively connected to the electrical contact point of the back housing.

It should be noted that embodiments and features described in the context of one of the aspects of the present invention also apply to the other aspects of the invention.

DETAILED DESCRIPTION OF THE INVENTION

Figure 1:
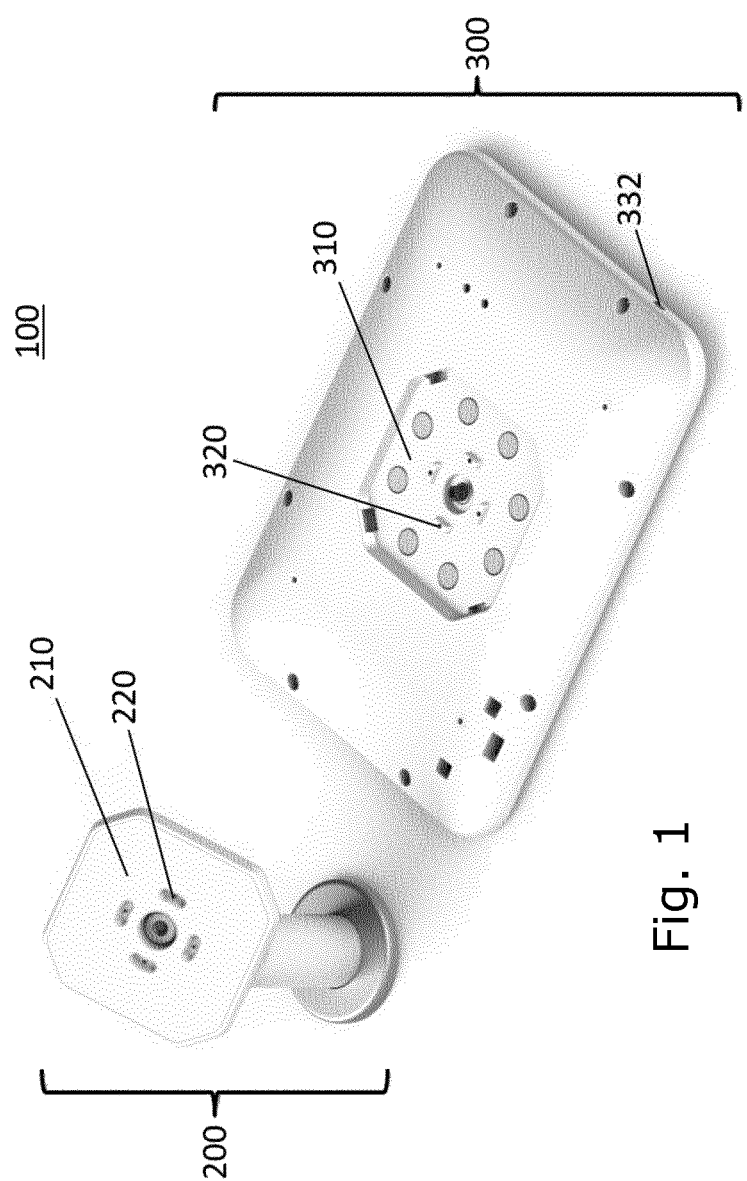
FIG. 1 shows a docking system in perspective view in accordance with various embodiments of the invention.
Figure 2:
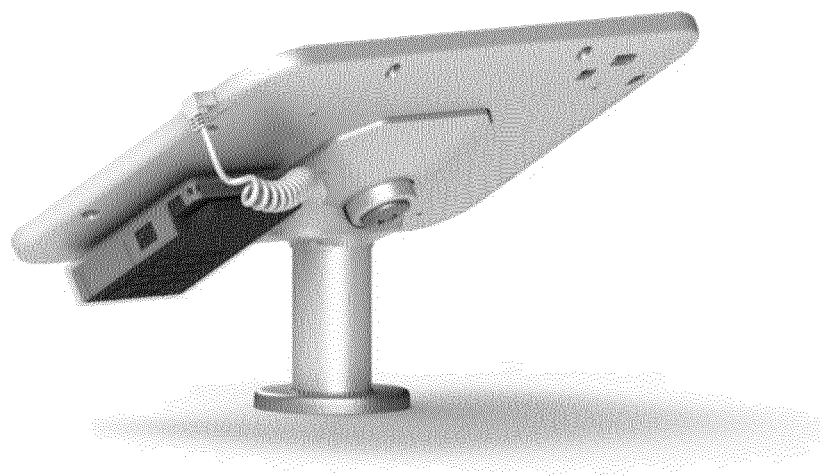
FIG. 2 shows a docking system in perspective view and with an auxiliary mobile electronic device connected to the second two-way power connection port for charging.
Figure 3:
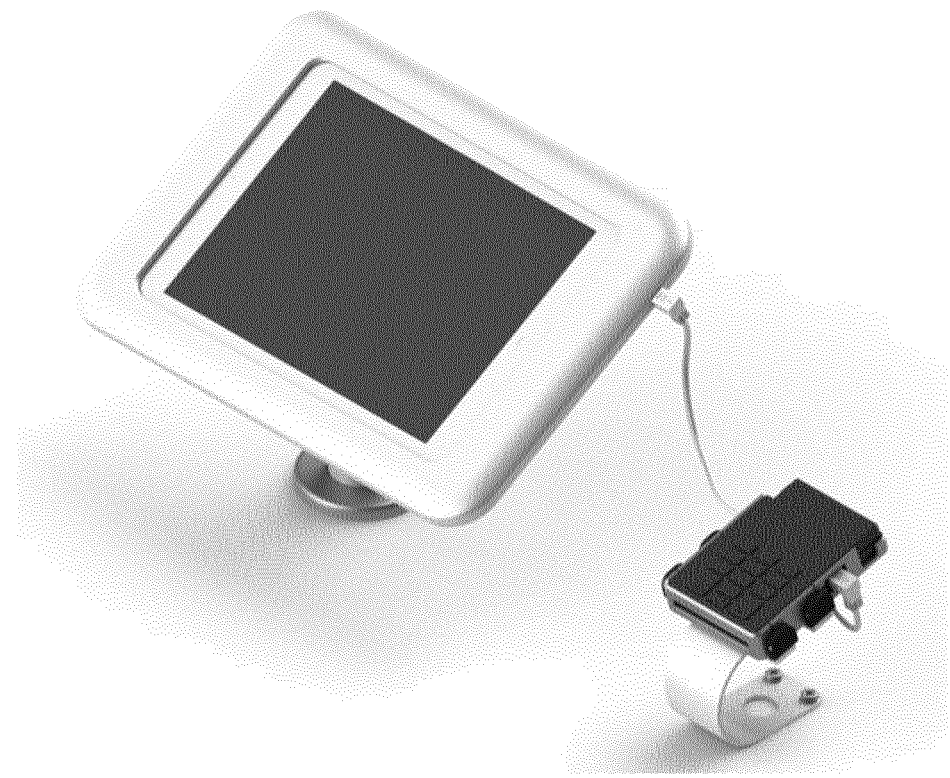
FIG. 3 shows a docking system in perspective view and with an auxiliary mobile electronic device connected to the second two-way power connection port for charging.

Referring to FIGS. 1-3, the general scheme of the invention is shown. FIG. 1 shows a docking system 100 for a mobile electronic device. The docking system 100 comprises a mounting head 200, and a mobile electronic device enclosure with a back housing 300.

The back housing 300 of the mobile electronic device enclosure is removably attachable to the mounting head 200.

The mounting head 200 comprises a part of a coupling mechanism 210 configured to removably couple the back housing 300 of a mobile electronic device enclosure to the mounting head 200.

The mounting head 200 comprises four electrical contact points 220 configured to be in electrical communication with a power source.

The back housing 300 of the mobile electronic device enclosure comprises a part of a coupling mechanism 310 configured to removably couple the back housing 300 to the mounting head 200.

The back housing 300 of the mobile electronic device enclosure comprises four electrical contact points 320 configured to be in electrical communication with the four electrical contact points 220 on the mounting head 200 when the back housing 300 is engaged with the mounting head 200 through the coupling mechanism 310.

Figure 4:
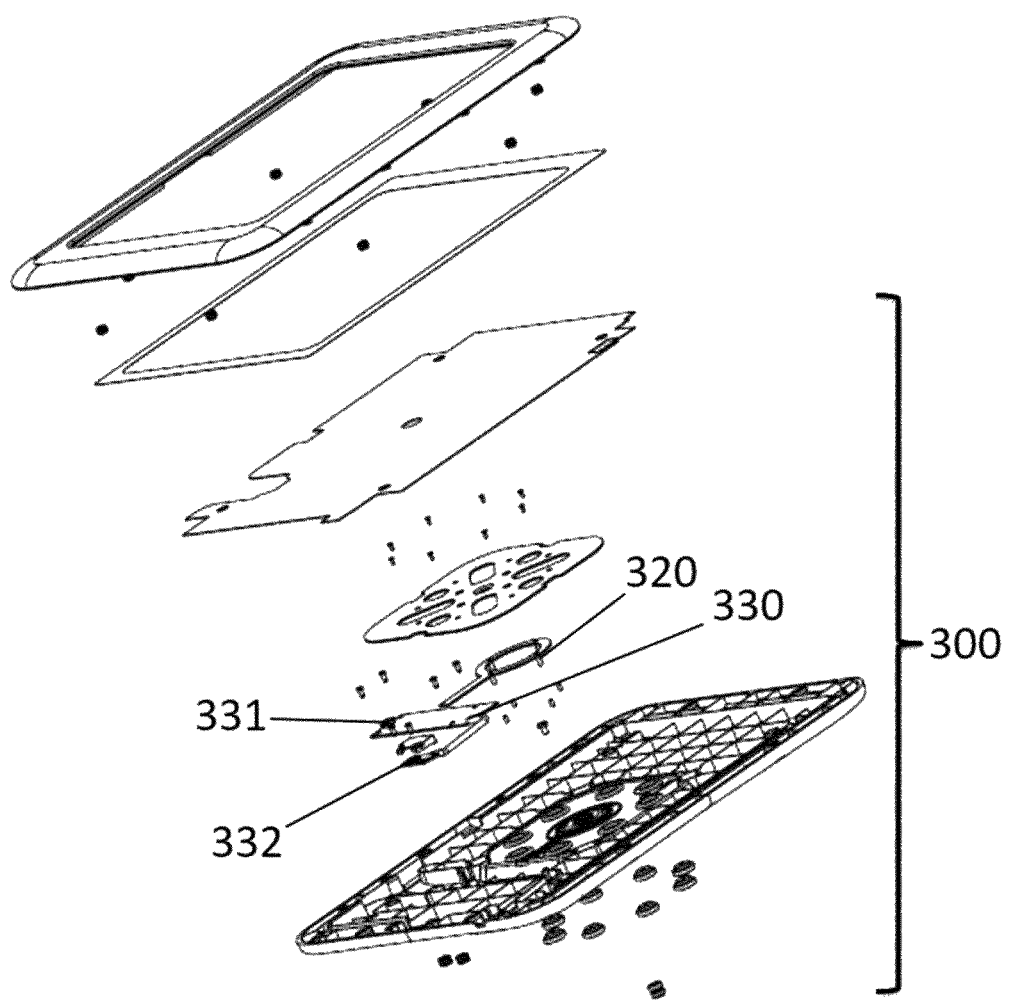
FIG. 4 shows an exploded view of the mobile electronic device enclosure in accordance with various embodiments of the invention.

FIG. 4 shows an exploded view of the mobile electronic device enclosure in accordance with various embodiments of the invention. The back housing 300 is shown with a charger control unit 330. The charger control unit 330 comprises a first power connection port 331, and a second two-way power connection port 332.

Figure 5:
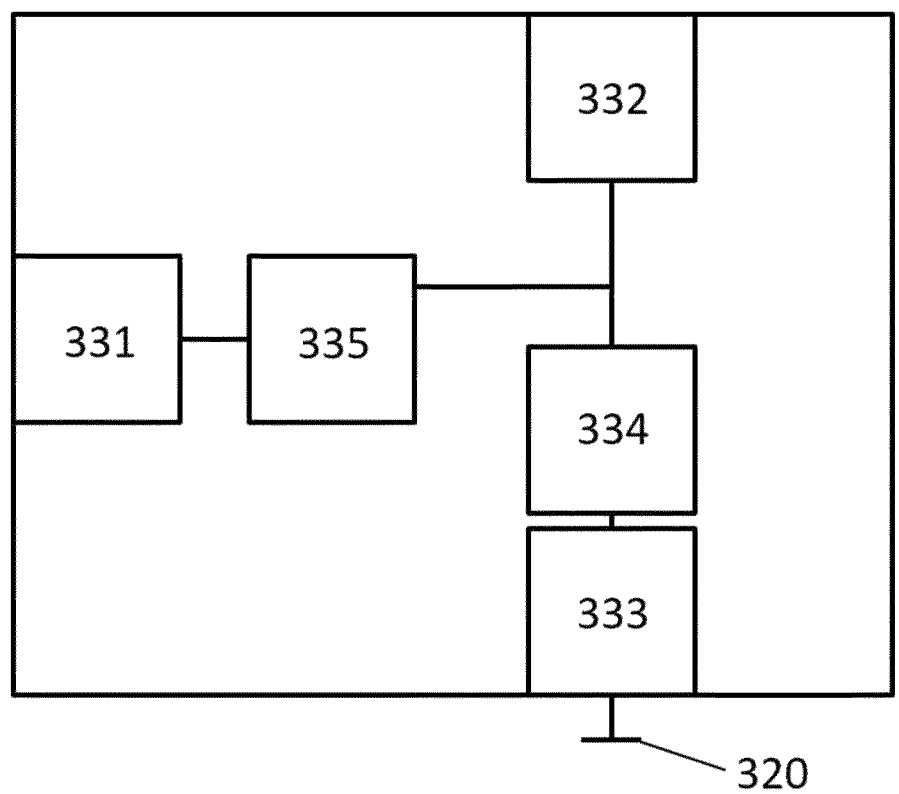
FIG. 5 shows a block diagram of the charger control unit in accordance with various embodiments of the invention.

FIG. 5 shows a block diagram of the charger control unit in accordance with various embodiments of the invention. The charger control unit comprises a first power connection port 331, a second two-way power connection port 332, a direct current polarity control circuit 333, a power supply controller circuit 334, and a charge monitoring circuit 335. A charging current is transferred from an electrical contact point on the mounting head to the electrical contact point 320 on the back housing.

The first power connection port 331 is configured for electrical communication with a mobile electronic device positioned in the back housing, and operatively connected to a) the electrical contact point 320 of the back housing, and b) to the second two-way power connection port 332. The second two-way power connection port 332 is configured for electrical communication with a) an auxiliary mobile electronic device, and b) an external power source, and operatively connected to the electrical contact point 320 of the back housing. Hence, the back housing, when docked, is configured to be used for charging an auxiliary mobile electronic device connected to the second two-way power connection port. Alternatively, an external power source may be connected to the second two-way power connection port 332, thereby allowing a mobile electronic device positioned in the back housing, and connected to the first power connection port 331, to be charged therefrom.

Figure 6:
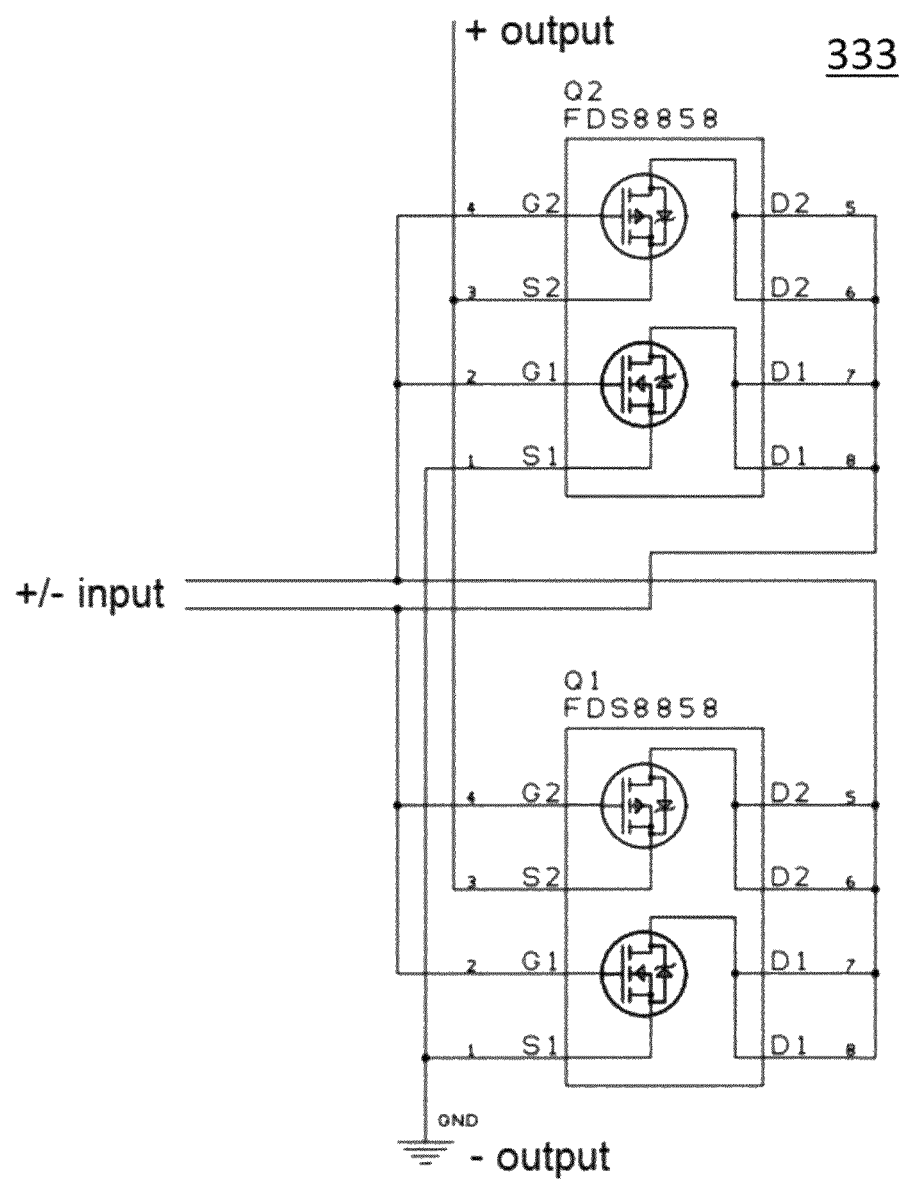
FIG. 6 shows a simplified schematic diagram of a direct current polarity control circuit in accordance with various embodiments of the invention.

The charger control unit further comprises a direct current polarity control circuit 333. This internal low-loss rectifier ensures that the polarity of the DC voltage is always correct when the back housing is mounted in either portrait or landscape position. The direct current polarity control circuit 333 comprises one or more metal oxide semiconductor field effect transistors (MOSFETs). The MOSFET has very low on-resistance and thereby very low loss compared to a classical diode bridge solution. FIG. 6 shows a simplified schematic diagram of a direct current polarity control circuit in accordance with various embodiments of the invention.

The charger control unit further comprises a power supply controller circuit 334. The voltage level in the mounting head is selected to 12V DC. This reduces the current level and thereby the impact of wire length and gauge.

Figure 7:
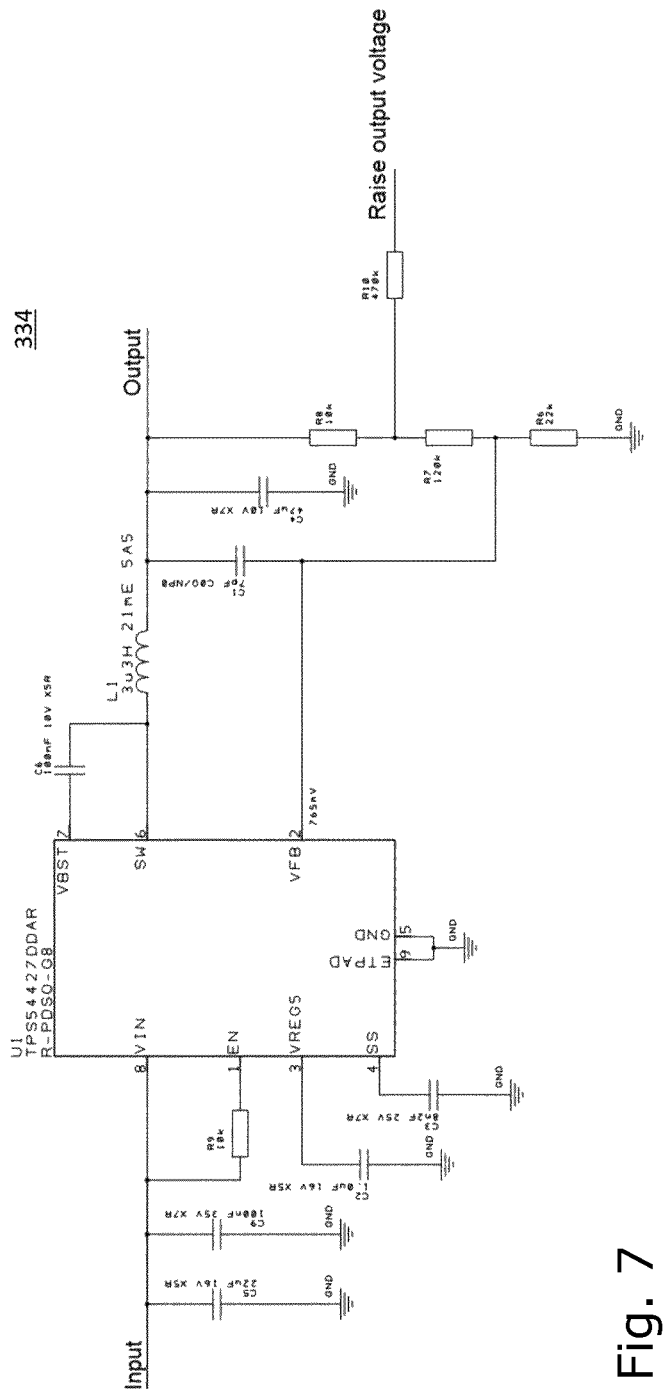
FIG. 7 shows a simplified schematic diagram of a power supply controller circuit in accordance with various embodiments of the invention.

Furthermore, the impact of dirt and dust on the contact points are reduced this way. The power supply controller circuit 334 is configured to convert the 12V DC input into 5.2V DC to be used for charging. The power supply controller circuit 334 is configured to raise the output voltage (e.g., with about 0.1V) to compensate for voltage drop at high loads. The circuit is current limited to 4A and has thermal shut down if the temperature exceeds the given limit. Both of these functions has auto reset, so that normal function will return, when the error is corrected. The power supply controller circuit 334 is a switch mode power-supply circuit. FIG. 7 shows a simplified schematic diagram of a power supply controller circuit in accordance with various embodiments of the invention.

Figure 8:
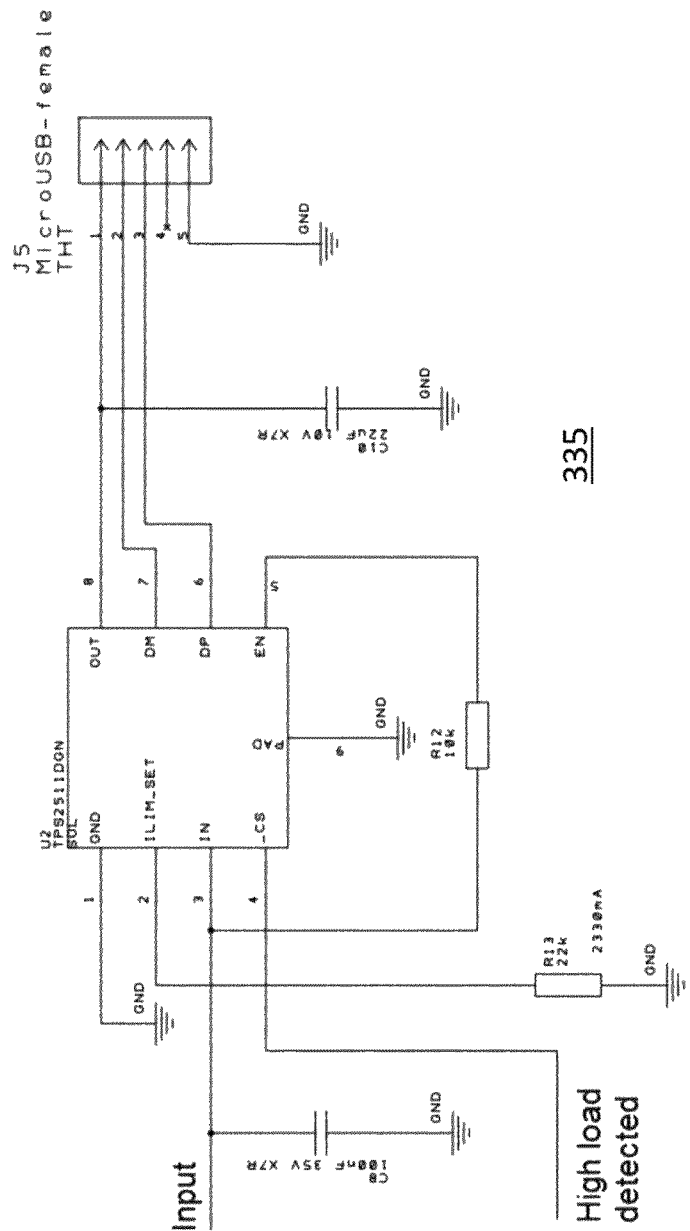
FIG. 8 shows a simplified schematic diagram of a charge monitoring circuit in accordance with various embodiments of the invention.

The charger control unit further comprises a charge monitoring circuit 335. Such circuit ensures that tablets are charged at maximum rate, without requiring any intervention from the user. The charge monitoring circuit 335 is configured to monitor the load current of the mobile electronic device positioned in the back housing. The charge monitoring circuit 335 is also configured to alter the power output from the power supply controller circuit 334 when the load current of the mobile electronic device positioned in the back housing exceeds a preset threshold limit. This way, voltage drops are eliminated in the charge monitoring circuit itself, in the first power connection port, and in any internal cables between the first power connection port and the mobile electronic device positioned in the back housing. FIG. 8 shows a simplified schematic diagram of a charge monitoring circuit in accordance with various embodiments of the invention.

REFERENCES

100 Docking system for a mobile electronic device
200 Mounting head
210 Part of a coupling mechanism
220 Electrical contact point
300 Back housing of a mobile electronic device enclosure
310 Part of coupling mechanism
320 Electrical contact point
330 Charger control unit
331 First power connection port
332 Second two-way power connection port
333 Direct current polarity control circuit
334 Power supply controller circuit
335 Charge monitoring circuit

The invention claimed is:

1. An apparatus comprising a docking system for a mobile electronic device enclosure comprising a back housing (300) and a front housing, wherein the back housing (300) comprises:
   a) a part of a coupling mechanism (310) configured to removably couple the back housing (300) of a mobile electronic device enclosure directly to a mounting head (200) of the docking system;
   b) at least one electrical contact point (320) configured to be in electrical communication with one or more electrical contact points (220) on the mounting head (200) when the back housing (300) is engaged with the mounting head (200) through the coupling mechanism (310);
   c) a charger control unit (330) comprising:
   a first power connection port (331); and
   a second two-way power connection port (332);
   wherein the electrical communication allows a charging current to be transferred from an electrical contact point on the mounting head to the electrical contact point (320) on the back housing (300);
   wherein the first power connection port (331) is configured for electrical communication with a mobile electronic device positioned in the back housing (300), and operatively connected to a) the electrical contact point (320) of the back housing, and b) to the second two-way power connection port (332);
   wherein the second two-way power connection port (332) is configured for electrical communication with a) an auxiliary mobile electronic device, and b) an external power source, and operatively connected to the electrical contact point (320) of the back housing (300).

2. The apparatus comprising a docking system for a mobile electronic device according to claim 1, wherein the charger control unit (330) further comprises a direct current polarity control circuit (333).

3. The apparatus comprising a docking system for a mobile electronic device according to claim 2, wherein the direct current polarity control circuit (333) comprises one or more metal oxide semiconductor field effect transistors (MOSFETs).

4. The apparatus comprising a docking system for a mobile electronic device according to claim 1, wherein the charger control unit (330) further comprises a power supply controller circuit (334).

5. The apparatus comprising a docking system for a mobile electronic device according to claim 4, wherein the power supply controller circuit (334) is a switch mode power-supply circuit.

6. The apparatus comprising a docking system for a mobile electronic device according to claim 4, wherein the power supply controller circuit (334) is configured for converting a voltage of 12V DC from the electrical contact point (320) of the back housing (300) into a voltage of 5.2V DC.

7. The apparatus comprising a docking system for a mobile electronic device according to claim 1, wherein the charger control unit (330) further comprises a charge monitoring circuit (335).

8. The apparatus comprising a docking system for a mobile electronic device enclosure according to claim 7, wherein the charge monitoring circuit (335) is configured to monitor the load current of the mobile electronic device positioned in the back housing (300).

9. The apparatus according to claim 1, wherein the mounting head comprises a base, a column extending from the base, and a head connected to an end of the column opposite the base, the head being configured to engage and hold the housing by engaging the back of the housing in different positions with respect to the base.

10. The apparatus according to claim 9, having a indentation in the back housing, and the head having a complementary edge configured for fitting within the indentation, electrical contact points in the head and complementary electrical contact points in the indentation.

11. The apparatus according to claim 10, wherein when the indentation is placed on the head, the mounting head and the back housing become a stable structure.

12. A docking system (100) for a mobile electronic device, comprising:
   a mounting head (200), and
   a back housing (300) and a front housing of a mobile electronic device enclosure;
   wherein the back housing (300) of the mobile electronic device enclosure is removably attachable to the mounting head (200);
   wherein the mounting head (200) comprises:
   a) a part of a coupling mechanism (210) configured to removably couple the back housing (300) of the mobile electronic device enclosure to the mounting head (200);
   b) at least one electrical contact point (220) configured to be in electrical communication with a power source;
   wherein the back housing (300) comprises:
   a) a part of a coupling mechanism (310) configured to removably couple the back housing (300) of the mobile electronic device enclosure to the mounting head (200);
   b) at least one electrical contact point (320) configured to be in electrical communication with one or more electrical contact points (220) on the mounting head (200) when the back housing (300) is engaged with the mounting head (200) through the coupling mechanism (310);
   c) a charger control unit (330) comprising:
   a first power connection port (331); and
   a second two-way power connection port (332);
   wherein the electrical communication allows a charging current to be transferred from an electrical contact point on the mounting head to the electrical contact point (320) on the back housing (300);

wherein the first power connection port (331) is configured for electrical communication with the mobile electronic device positioned in the back housing (300), and operatively connected to a)

the electrical contact point (320) of the back housing, and b) to the second two-way power connection port (332);

wherein the second two-way power connection port (332) is configured for electrical communication with a) an auxiliary mobile electronic device, and b) an external power source, and operatively connected to the electrical contact point (320) of the back housing (300).

13. The docking system (100) for a mobile electronic device according to claim 12, wherein a voltage of 12V DC is delivered to the electrical contact point (220) on the mounting head (200).

14. The docking system (100) according to claim 12, wherein the charger control unit (330) further comprises a direct current polarity control circuit (333).

15. The docking system (100) according to claim 14, wherein the direct current polarity control circuit (333) comprises one or more metal oxide semiconductor field effect transistors (MOSFETs).

16. The docking system (100) according to claim 12, wherein the charger control unit (330) further comprises a power supply controller circuit (334).

17. The docking system (100) according to claim 16, wherein the power supply controller circuit (334) is a switch mode power-supply circuit.

18. The docking system (100) according to claim 16, wherein the power supply controller circuit (334) is configured for converting a voltage of 12V DC from the electrical contact point (320) of the back housing (300) into a voltage of 5.2V DC.

19. The docking system (100) according to claim 12, wherein the charger control unit (330) further comprises a charge monitoring circuit (335).

20. The docking system (100) according to claim 19, wherein the charge monitoring circuit (335) is configured to monitor the load current of the mobile electronic device positioned in the back housing (300).

\* \* \* \* \*